(12) United States Patent
Schlonski et al.

(10) Patent No.: US 7,187,461 B2
(45) Date of Patent: Mar. 6, 2007

(54) SYSTEM FOR MANAGING DIGITAL PRINTERS AND SERVERS VIA A NETWORK

(75) Inventors: Steven T. Schlonski, Webster, NY (US); Michael G. Leccarde, Penfield, NY (US); Michael H. Wang, Macedon, NY (US); Jeffrey R. Earl, Macedon, NY (US); Lawrence W. Meyer, Fairport, NY (US); M. Kerrigan Hawes, Pittsford, NY (US); Michael C. Burkard, Canandaigua, NY (US); Daniel J. Stark, Weber, NY (US)

(73) Assignee: Xerox Corporation, Stamford, CT (US)

( * ) Notice: Subject to any disclaimer, the term of this patent is extended or adjusted under 35 U.S.C. 154(b) by 878 days.

(21) Appl. No.: 10/106,140

(22) Filed: Mar. 25, 2002

(65) Prior Publication Data

US 2002/0196463 A1 Dec. 26, 2002

Related U.S. Application Data

(60) Provisional application No. 60/300,655, filed on Jun. 25, 2001.

(51) Int. Cl.
*G06F 3/12* (2006.01)
*G06K 1/00* (2006.01)

(52) U.S. Cl. .................. 358/1.15; 709/203; 710/15

(58) Field of Classification Search ............... 358/1.15, 358/1.13; 709/203, 219; 710/15
See application file for complete search history.

(56) References Cited

U.S. PATENT DOCUMENTS

| 5,128,878 | A | * | 7/1992 | Gore et al. ............... 345/502 |
| 5,287,434 | A | * | 2/1994 | Bain et al. ............ 235/462.15 |
| 5,572,640 | A | | 11/1996 | Schettler ................ 395/140 |
| 5,580,177 | A | * | 12/1996 | Gase et al. ................ 400/61 |
| 5,687,301 | A | | 11/1997 | Stokes et al. ............. 395/112 |
| 5,687,320 | A | | 11/1997 | Wiley et al. .......... 395/200.16 |
| 5,832,191 | A | | 11/1998 | Thorne .................. 395/114 |
| 5,956,487 | A | | 9/1999 | Venkatraman et al. . 395/200.48 |
| 5,995,721 | A | * | 11/1999 | Rourke et al. ........... 358/1.15 |
| 6,246,486 | B1 | * | 6/2001 | Takahashi ............... 358/1.13 |
| 6,249,821 | B1 | * | 6/2001 | Agatone et al. .......... 719/316 |
| 6,469,796 | B1 | * | 10/2002 | Leiman et al. ........... 358/1.15 |
| 6,584,503 | B1 | * | 6/2003 | Carney et al. ........... 709/224 |
| 6,864,991 | B1 | * | 3/2005 | Takahashi ............... 358/1.15 |
| 2002/0063886 | A1 | * | 5/2002 | Johnson ................ 358/1.15 |

* cited by examiner

*Primary Examiner*—Kimberly Williams
*Assistant Examiner*—Dillon Murphy
(74) *Attorney, Agent, or Firm*—R. Hutter (57) ABSTRACT

In a network comprising printers and print servers which retain queues of print jobs, a user is able to survey and view selected portions of the network, either by enumerating printers to be queried directly, or by enumerating servers. By providing substantially simultaneous "views" of printers and queues in servers, problems within a large network can be readily isolated.

2 Claims, 9 Drawing Sheets

SYSTEM FOR MANAGING DIGITAL PRINTERS AND SERVERS VIA A NETWORK

CLAIM OF PRIORITY TO PROVISIONAL PATENT APPLICATION

Priority is claimed to U.S. Provisional Patent Application Ser. No. 60/300,655, filed Jun. 25, 2001.

CROSS-REFERENCE TO RELATED APPLICATION

Cross-reference is hereby made to co-pending U.S. patent application Ser. No. 10/109,800, U.S. Published Patent Application No. 2002/0196451, entitled "SYSTEM FOR REPLICATING DESIRED CONFIGURATIONS FOR PRINTERS ON A NETWORK," assigned to the assignee hereof and being filed simultaneously herewith.

FIELD OF THE INVENTION

The present invention relates to a system for managing a plurality of digital printers, such as inkjet printers or laser printers, over a network. In particular, the present invention is directed toward managing a set of printers which are interconnected to source computers through print servers.

BACKGROUND OF THE INVENTION

The concept of "network printing," in which any of a plurality of computers submit digital data to one of any number of printers over a network, is well known. One recent development in the field of network printing is the provision of web access functionality embedded in each individual printing apparatus, including print servers, so that each printing apparatus on a network can make available a web page, and a user can access the web page to discover or alter conditions of an individual digital printer.

The present invention is a system for discovering all available printers and servers available on the network, and then allowing a user to view a list of the printers and servers on the network. The system of the present invention is automatic to the extent that, according to a preferred embodiment, a user need only perform a single-click operation to freshly discover and troubleshoot all available printers and servers on a network.

DESCRIPTION OF THE PRIOR ART

U.S. Pat. No. 5,572,640 discloses "discovery/layout" software which configures a general purpose computer system to act as a management station using the SNMP protocol. The software has a discovery mechanism and a layout mechanism which, in combination, permit the software to provide various submaps on demand to a display.

U.S. Pat. No. 5,687,301 is a system which allows for field changes of the function of a print driver based on the application requesting print driver services. Using a utility, an application is selected and a flag is set that indicates the problem function. The flag and information about the associated application are stored in a data structure, and the data structure is stored in a storage device. When the application requests services of a printer driver, all the data structures are scanned looking for an entry for the application. If an entry is found, then the function flag is used to direct a change in the function of the printer driver.

U.S. Pat. No. 5,687,320 discloses a system for allowing a selected type of network device or resource, such as printers, to be discovered on a subnetwork and on remote subnetworks on a network. A broadcast message is sent requesting a response from each host on the subnetwork with a file having a listing of the device. Upon receipt of responses, a "stifle" message is transmitted to the host, thereby allowing subsequent broadcast messages to generate responses from remaining hosts. The responding hosts are then queried in order to obtain address information of potential devices on the subnetwork.

U.S. Pat. No. 5,832,191 discloses a method for enabling a printer which is newly installed on a network to automatically communicate with client processors on the network. In the disclosed arrangement, each printer installed on the network constantly broadcasts printer identification data onto the network. Each printer on the network broadcasts information about a specific predefined format.

U.S. Pat. No. 5,956,487 discloses the concept of providing web access functionality in a device such as a printer, to enable widely accessible and enhanced user interface functions for the device. A network interface in each device enables access to the web page by a web browser such that a user of the web browser accesses the user interface functions for the device through the web page.

SUMMARY OF THE INVENTION

According to one aspect of the present invention, there is provided a method of operating a plurality of printers and at least one server on a network, each of the printers and the server having a network address, comprising querying the server to enumerate queues residing therein; and, for each enumerated queue, identifying at least one printer associated therewith.

According to another aspect of the present invention, there is provided a method of operating at least one printer and at least one server on a network, each of the printer and the server having a network address, the server holding a print queue for the printer. An operational status of the printer is surveyed, by directly addressing the printer's network address. An operational status of the server is surveyed, by directly addressing the server's network address. A result of the surveying step of the printer and a result of the surveying step of the server are substantially simultaneously displayed.

DETAILED DESCRIPTION OF THE INVENTION

Figure 1:
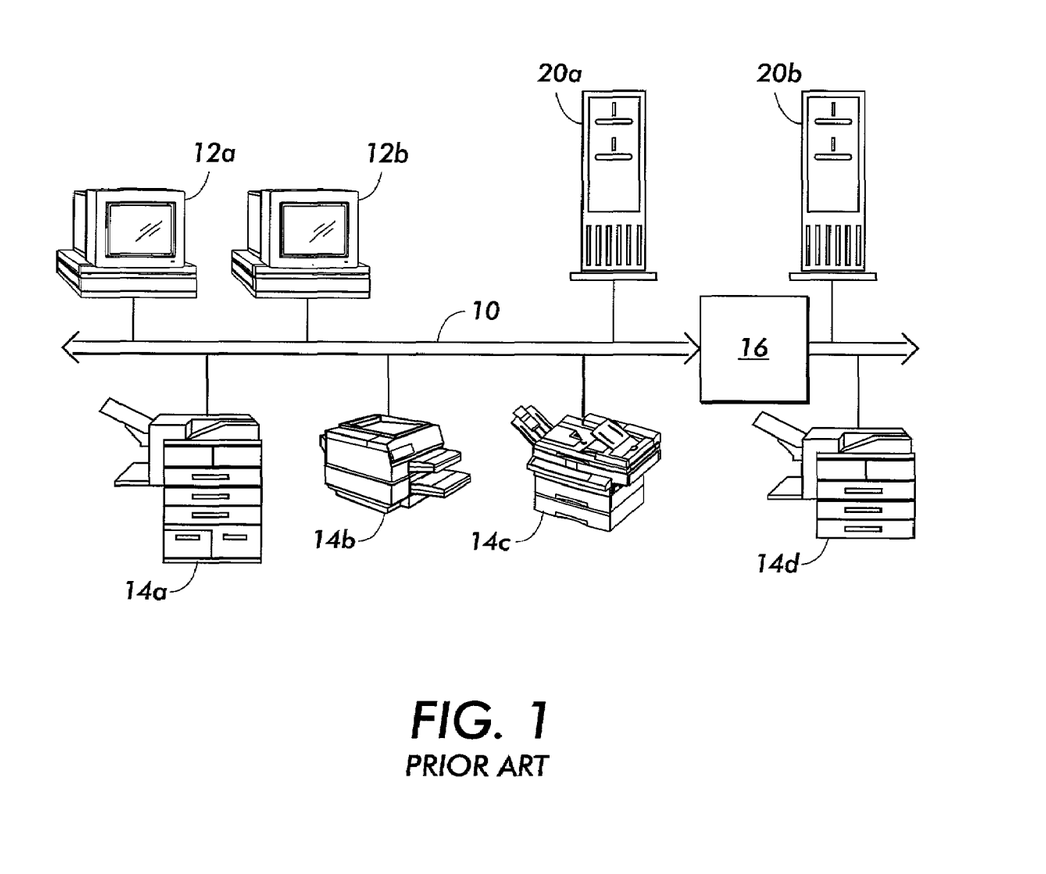
FIG. 1 is a simplified view showing a configuration of printers and servers available on a network and on a subnetwork, illustrating the context of the present invention.

FIG. 1 is a simplified diagram showing the context of the present invention. There is provided a network 10 of a type familiar in the art, such as a network which utilizes the Ethernet® protocol. Existing on this network 10 is at least one computer 12 and, for purposes of the present invention, a plurality of printers, such as here labeled 14a–14c. There is further provided on network 10 what is known as a "router" 16. As is well known in the art, a router such as 16 is capable of discriminating among requests placed on network there 10 connected thereto, so that only specifically-directed requests received by router 16 will be allowed through the router 16, such as to access further printers such as 14d. As is well known, a router 16 serves as to define a "subnetwork" or "subnet" which is separable from any larger network on which the router 16 exists. As is known in the art, in FIG. 1 the set of printers 14a–14c form one subnet, while printer 14d, being on the other side of router 16, can be considered part of another subnet. (For purposes of the present discussion and claims, unless otherwise specified, the words "network" and "subnetwork" or "subnet" can be used interchangeably. Also, the word "printer" can for present purposes mean not only a printer, but any kind of device having printer-like features, such as a multifunction device, digital copier, input scanner, facsimile, etc.)

Computer 12 in FIG. 1 can be the computer of a systems administrator responsible for the activities of all of the printers on network 10, for example, making sure that a certain number of printers are available for other users on network 10, making sure the printers on network 10 are of particular types, and making sure that the installed printers are functioning. In a real-world context, particularly when there are dozens or even hundreds of printers such as 14a–14c on a network, it is inevitable that printers will be installed and removed from a network 10, or a particular subnetwork, on a fairly regular basis. Further, various installed printers may go offline and return online for various reasons. It is thus not a trivial matter for a system administrator on a computer 12 to have to check what printers are available on a particular network or subnetwork at any given time. Once the various printers are discovered, it is desirable for the system administrator to be able to inspect the web page of each individual printer to make sure that any particular printer is functioning properly. As will be described below, the fact that many of the conditions of an individual printer can be observed or altered through the embedded web page of the printer means that any available function of the printer that is accessible through the web page of the printer can thus be accessed through computer 12.

Figure 2:
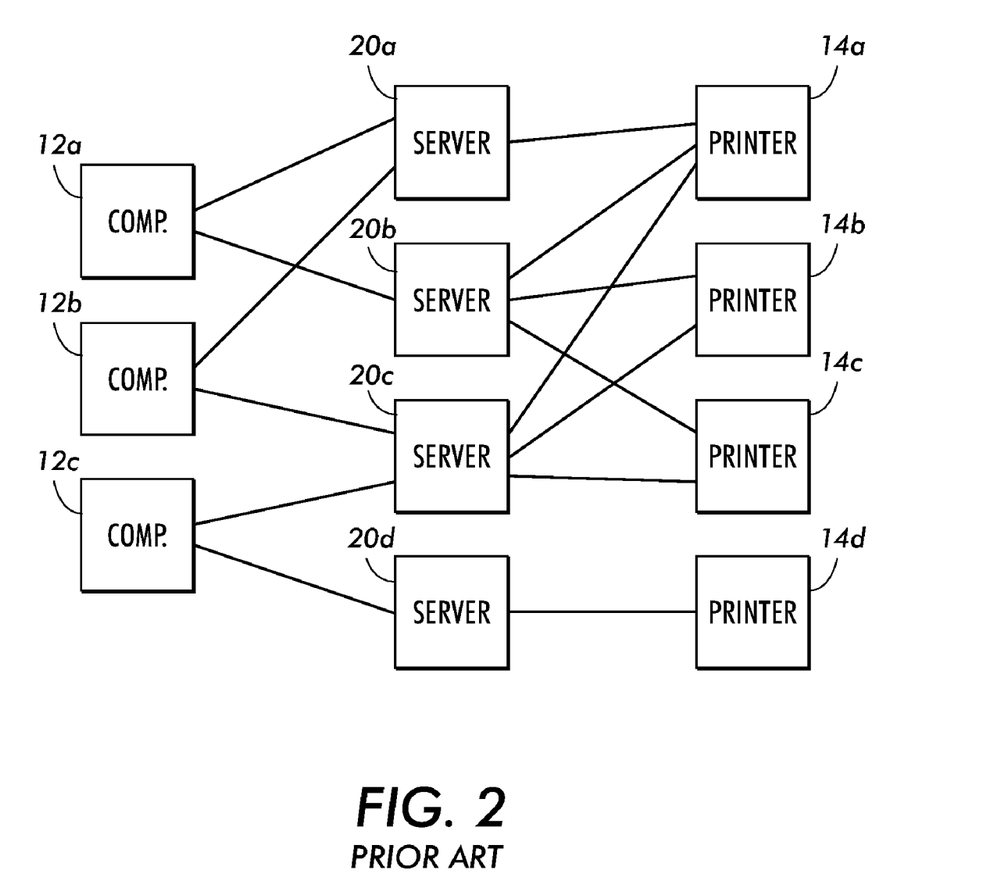
FIG. 2 is a diagram showing an example of customary relationships among individual computers, printers, and servers.

FIG. 2 is a diagram showing a typical relationship of a set of printers 12a, 12b, . . . , printers 14a, 14b, . . . and a number of servers, which are indicated in FIG. 2 as 20a, 20b . . . . In contrast to the physical relationship shown in FIG. 1, the arrows shown in FIG. 2 represent examples of what can be called "customary" relationships among subsets of each type of device. In a typical practical context, a user at computer 12a will wish to send print jobs only to printers, such as 14a or 14b, which are in physical proximity. Thus, a server such as 20a will provide to computer 12a ready access (such as on a display menu) only to printers 14a or 14b: other printers and servers on the network may not be available to the user of computer 12a, at least not without special permission. Thus, while it may be physically possible for a computer 12a in the United States to send a job to printer 14c in France, the arrangement of servers 20 may intentionally make this difficult, because having all computers potentially accessing all printers may be inefficient.

The use of servers as an intermediate layer between computers and printers may further have practical aspects relating to the personnel who service the network. A typical relationship of personnel in a network is as follows. For simple procedures involving printers, such as adding paper, the end users may be made responsible, and therefore the end users should receive information about empty paper trays. For more complicated problems, responsibility is given to system administrators, and in turn system administrators are given information about and access for these problems. Finally, another class of personnel, for instance "network administrators," may have jurisdiction over all computers, including servers, and thus will have access to information about the servers. For this reason, management of access to different types of information in a network is desirable.

What follows is a description of embodiments of different methods of device discovery, printer-based and queue-based viewing of printer information, and printer and server troubleshooting, according to different aspects of the present invention.

Basic Network Discovery

Figure 3:
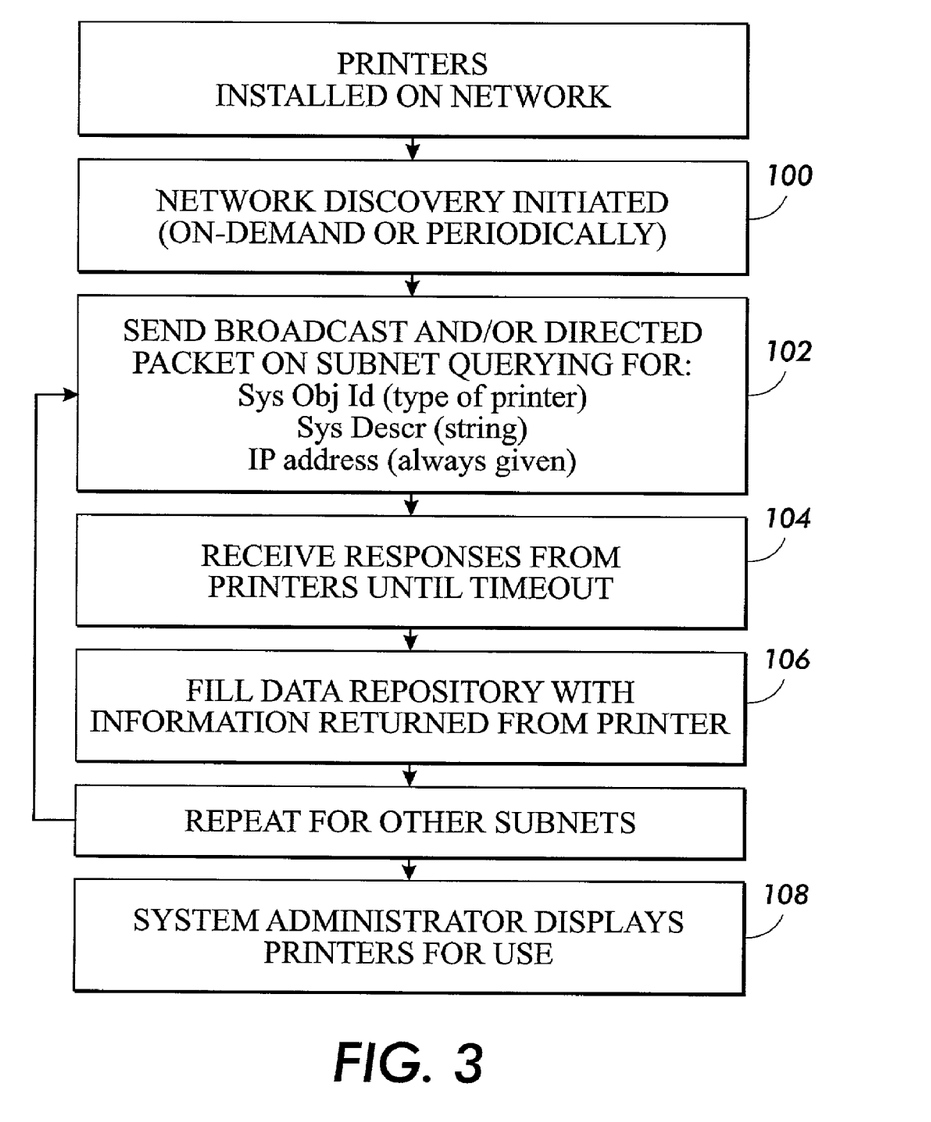
FIG. 3 is simplified flow chart showing the basic steps of a basic network discovery method usable with the present invention.

FIG. 3 is a simplified flow chart showing the basic steps of a system in which, first, all of the printers on a network or subnetwork such 10 are discovered, and then information about each individual printer obtained through such discovery process is displayed in a user interface whereby, once the printers on a particular network or subnetwork are identified, the printers are selectable through a simple displayed list. Finally, once the user interface is created and displayed to the system administrator on computer 12, the web site of any particular printer on network 10 can be accessed by the system administrator simply by clicking on a particular internet address or other name on a displayed list. Then, if it is desired to check or alter a condition or function of a particular printer or network 10, this can be carried out directly through the web page of the selected printer.

Various printers will be installed or disinstalled on a particular network at various times. When it is desired to discover all the printers on a network or subnetwork at a particular time, a systems administrator (SA) can cause the computer 12 to send out a packet on a particular subnet (or, of course, on the network 10 itself, if there are no distinct subnets). Alternately, it may be desired to automatically initiate a discovery step (that is, placing of the packet on a particular subnet or network) on a regular basis, such as every 24 hours or on every reboot of the computer 12. This initiation of network discovery is shown as step 100.

At network discovery, a packet is placed on the network 10 and is thus made available to every printer that may be on a particular network or subnet. All printers such as 14a–14c which are compliant to a standard such as RFC-1759 or RFC-1213 will, according to the standard, respond to the packet (descriptions of these standards can be seen at www.ietf.org). The "payload" part of the packet is a request for three distinct types of data. As shown in step 102, the packet requests the system object ID, which is a special code indicating the make and model or type of printer (every manufacturer of printers is assigned a specific code, and then assigns another code to various models it manufactures); a system description, which is a string variable which describes the type of printer in more human-readable terms (e.g., "Xerox DocuPrint N60 printer"); and finally the IP address of the printer in question, which is always provided in a response to a packet.

At step 104, it can be seen that following the placing of the packet on network 10 by computer 12, computer 12 will wait for a predetermined period of time, such as 8 seconds, to receive responses from any printers which may be on a particular subnetwork or network 10. The computer 12 thus collects all the responses (system object ID, system description, and IP address) that it receives. This data initially collected from the printers in response to the packet is then used to provide data to what is known as a user interface and allowed to populate the user interface. Then, a list of system descriptions and IP addresses for all of the discovered printers is created.

As further can be seen in step 108, it may be necessary to repeat the above process of placing packets for other subnets of interest to the user of computer 12. As is well known, in order to access distinct subnets within a larger network, it is necessary to know a relevant address associated with the subnet, which would be passed through a router such as 16 in FIG. 1. Additional printers found as new subnets are communicated to can simply be added to an accumulating list of printers in the user interface.

Once all of the desired subnets have experienced the network discovery such as shown as steps 102–106, there will result a user interface in which all of the known printers are listed in the display. In a preferred embodiment of the present invention, this resulting list can be displayed to the systems administrator on computer 12, who in turn can select individual printers listed therein. When the systems administrator (SA) thus selects a printer, the point-and-click action thus causes the selected printer to be accessed over network 10, and the web page of the selected printer to appear in the user interface, as shown at step 108 of FIG. 3. Once the systems administrator thus has access to the web page and embedded web server of the selected printer, the system administrator can access, and as necessary alter, any information available to the system administrator through the web site of the particular printer.

Printer View and Queue View

In larger, such as corporate-wide, networks supporting a large population of printers, it is typical to include, in addition to computers 12a, 12b, . . . and printers 14a, 14b, . . . a number of servers, which are indicated in FIG. 1 as 20a, 20b, . . . . The function of the servers, which are basically computers which are usually on, is to retain "queues" of jobs which originate at the computers for printing on the printers. In a physical sense, each of both the printers and the servers have an independent IP (internet protocol) address; however, in common use, a user at a computer 12a wishing to print a job at a printer 14a will in fact invoke only the IP address of a relevant server such as 20a, such server holding the requested job in its queue until a printer associated with the server is able to accept the job for printing. At that point, the server 20a itself invokes the IP address of the desired printer: the computer 12a does not customarily address the printer 14a directly.

Figure 4:
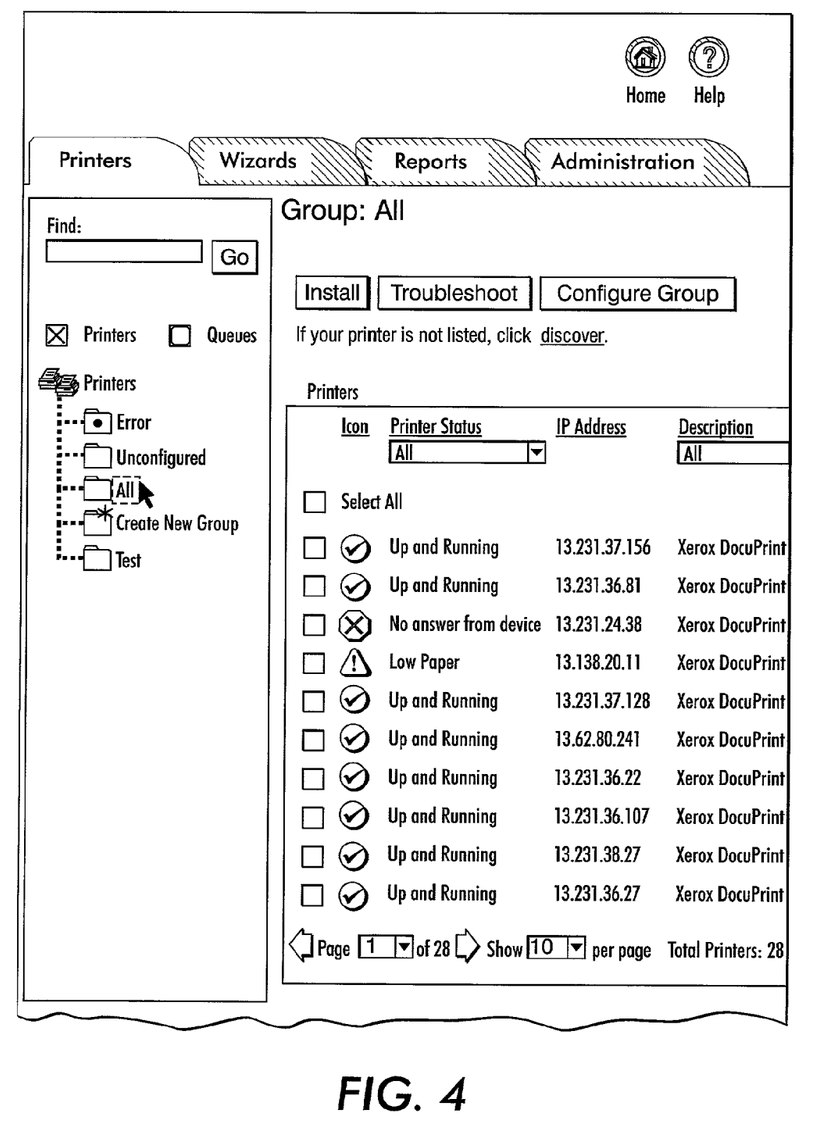
FIG. 4 and 5 are example screen displays as would be available with an embodiment of the present invention.
Figure 5:
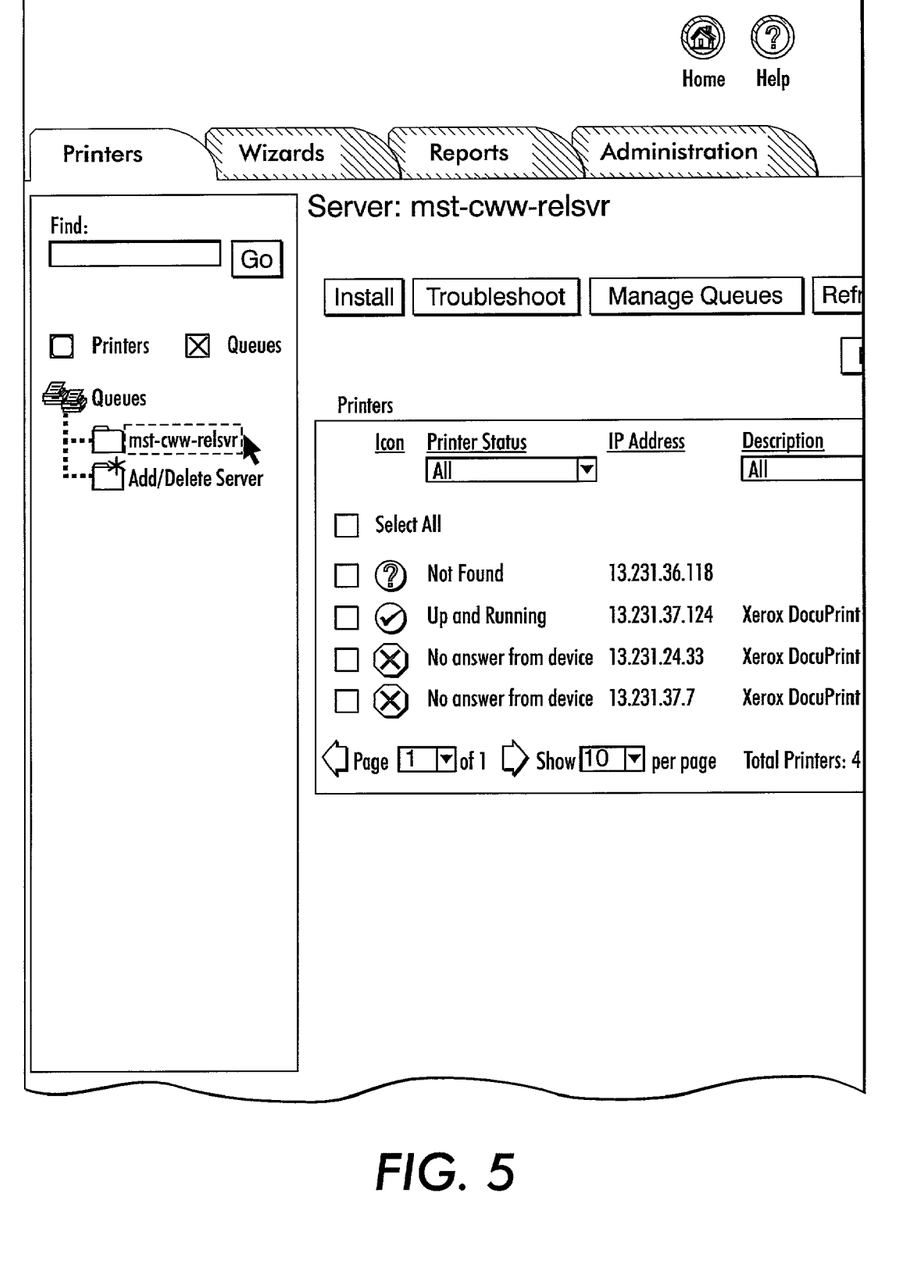

According to one aspect of the present invention, a user of any computer 12, typically a systems administrator or network administrator, can have available to him, through his computer 12, a choice of "views" of a set of printers 14 forming a portion of the total network. In particular, a user may have the option of either a "printer view" or a "queue view", which is to say, a survey of the activities of a certain a subset of printers via those servers which are customarily connected to them. FIGS. 4 and 5 are, respectively, screen views of a printer or a set of printers on a network or subnetwork. FIG. 4 shows a screen representing information about all discovered printers on a particular network. FIG. 5 is an alternate screen view of only those printers connected via a particular server, here named for example "mst-cww-relsvr" as indicated in the screen. As can be seen in the figures, by selecting either "queue view" or "printer view" buttons, a user can see in one screen information about either all the printers associated with a particular network or subnetwork, or else all the printers associated with a named server, each in the same "snapshot" time of sampling, which is to say the queue view and the printer view can be in effect simultaneous in that each view reflects the state of the network at substantially the same time.

Figure 6:
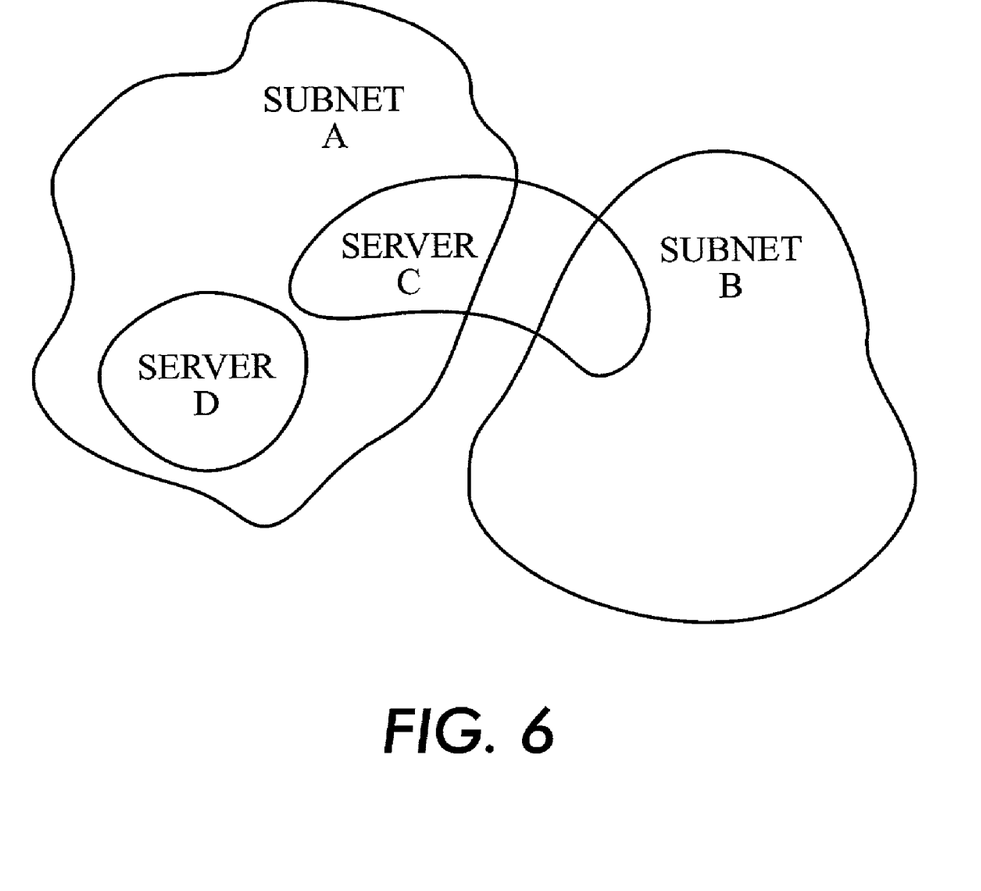
FIG. 6 is a diagram showing an example relationship among servers and networks among a population of printers.

The distinction between a "printer view" and a "queue view" may be of interest in situations in which different personnel are given responsibility for servers and printers. FIG. 6 is a diagram showing how the relationship of certain servers among a population of printers may be independent of the existence of networks or subnetworks (subnets) such as defined by routers 16 such as shown in FIG. 1 above. As can be seen, if there are two subnets, such as indicated as subnet A and subnet B, a particular server which exists within one subnet, and which serves directly a population of printers such as C, may have associated therewith a printer in the other subnet. Similarly, a queue based view may be determined by a server population which is a subset of a particular subnet, such as with population D. If there is a problem at particular server, a number of printers within each subnet will be affected, and therefore it would be desirable to isolate, as part of a troubleshooting operation, a set of printers whose jobs pass through a named server. Of course, once it is determined that a server is at fault and not a printer, in many situations a network administrator with jurisdiction over the servers will be responsible, as opposed to the other person who has jurisdiction over printers.

The printer views and queue views shown in FIGS. 4 and 5 respectively both show the status of those printers selected in a certain manner. As can be seen in both figures, the user has a choice of selecting the printers or queue views, based on a named server holding the queue. In either case, it can be seen that the IP address and description of the particular printer, with its current status, is displayed to the user. The general method of obtaining this data for each printer of interest is described above with regard to FIG. 3.

Figure 7:
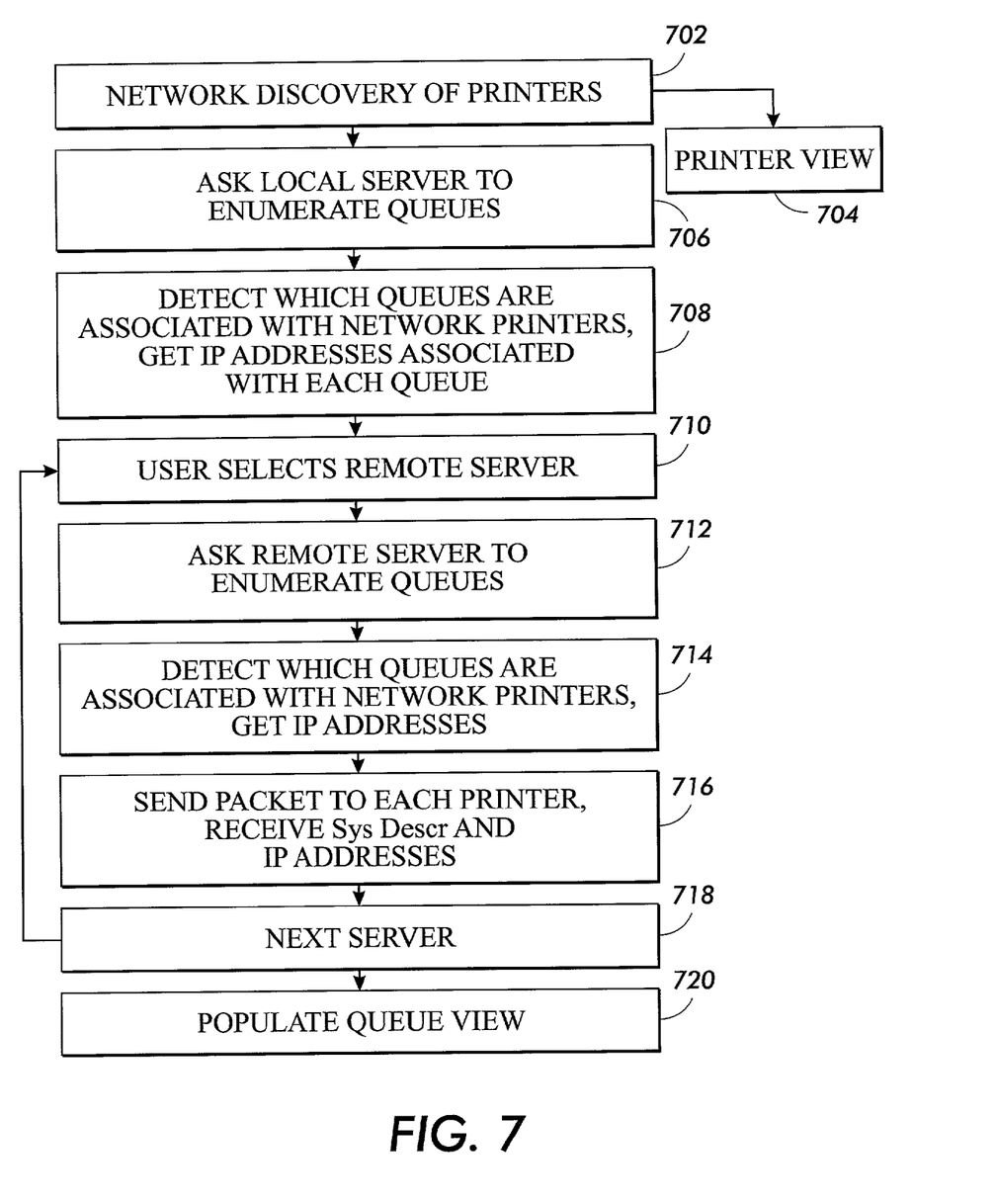
FIG. 7 is a flowchart showing a method of obtaining printer-based and queue-based views of a population of printers.

FIG. 7 is a flowchart showing the basic steps by which information suitable for display is collected, either in the printer view of FIG. 4 or the queue view of FIG. 5. The following description represents one possible embodiment of the method, and variations of the method, such as varying the order of the described steps, or performing certain steps simultaneously with other steps, are certainly possible.

At step 702, there is performed a straightforward direct discovery of all printers on the network, without regard to any servers which may be on the network as well. Step 702 can be summarized as the basic network-discovery steps described above with regard to FIG. 3. This general network discovery, constrained of course by the limitations of the discovery process (such as firewalls and/or the finite time in which answers to a packet are monitored) results in the standard "printer view," such as shown in FIG. 4, and which is noted at step 704. Following this determination of the "printer view," a "queue view," which takes the servers into account, can be assembled.

To obtain the queue view, an administrator first requests her local network to enumerate queues residing on any servers in the network (step 706). The system then detects which queues are associated with network printers (i.e., printers which have a usable IP address) and retrieves IP addresses, as well as any other available information, associated with each queue (step 708). At this point the administrator may select various remote servers of possible interest, and query each server in turn for information about its queues. The administrator selects a remote server (step 710) and asks it to enumerate the queues therein (step 712). As above, the queues within the server are examined to determine which of them are associated with network printers, and the IP addresses of those printers are thus obtained (step 714). Once these IP addresses are obtained, the system can send a packet to each of the named printers to obtain the relevant OID's therefrom (step 716), including information relating to a current operational status of the printer, such as shown in FIG. 4 and 5. Once that information is obtained for all servers associated with the server, another server can be selected (step 718). Finally the information thus obtained for one or more servers can be used to populate a screen associated with the server, much in the manner of FIG. 5 above (step 720).

In the cases of getting information about relevant printers from both the local server and any remote servers (such as at step 716), the basic method of sending out packets and retrieving OID's can be used, much in the manner of steps 102 and 106 as described above with regard to FIG. 3. One basic difference between the FIG. 3 method and the FIG. 7 method is that, in contrast to the network discovery step 702, a packet to each printer is not necessary to obtain queue views, because the server will already have the IP addresses of printers associated with it, and the requests for OID's from the printers can thus be addressed directly to the printers of interest.

Troubleshooting of Both Printers and Servers

In addition to the advantages provided by giving a user the option of a printer view or a queue view, the distinction between these views and the underlying information can be further exploited in a troubleshooting step. According to this aspect of the present invention, a user confronting an observed failure of a particular printer or multiple printers can automatically, such as by clicking a single "troubleshoot" button such as shown in FIG. 4 or FIG. 5, perform a status check on both a particular printer(s) of interest, and any or all servers which are customarily associated with those printer(s), and thus isolate the source of a detected malfunction. With further regard, for example, to the screens shown in FIGS. 4 and 5, a user can highlight, through known means, particular printer(s) which are showing a malfunction, and then click the "troubleshoot" button as shown.

In response to this action, a status check is performed on the printer(s) directly and also on the printer(s) through one or more associated servers. In a basic, physical, sense, the printer(s) and any servers associated therewith will each have its own independent IP address. Customarily, however, when print servers are used, the IP address of the printer is never directly invoked by a computer sending the job to be printed: rather, in such a case, the job is sent to a server which holds the queue, and then the server in turn invokes the IP address of the desired printer. According to this aspect of the present invention, however, for the status check, first the computer performing the method does a status check to the IP address(es) of the printer(s) directly, bypassing any servers. This status check is typically a "ping," which is known in the art as the sending of a special code to a network device, this special code simply causing the network device to repeat the code that was sent. If the repeated code is not detected from the printer within a predetermined period of time, this is an indication that the printer is not properly functional. Also, one or more servers to which the printer is available are similarly pinged. If the status check of one server fails, the problem with the system can then be isolated. According to one embodiment of the present invention, a single action, such as a click on the troubleshoot button, will automatically invoke these status checks, and thereby isolate a source of a malfunction.

Figure 8:
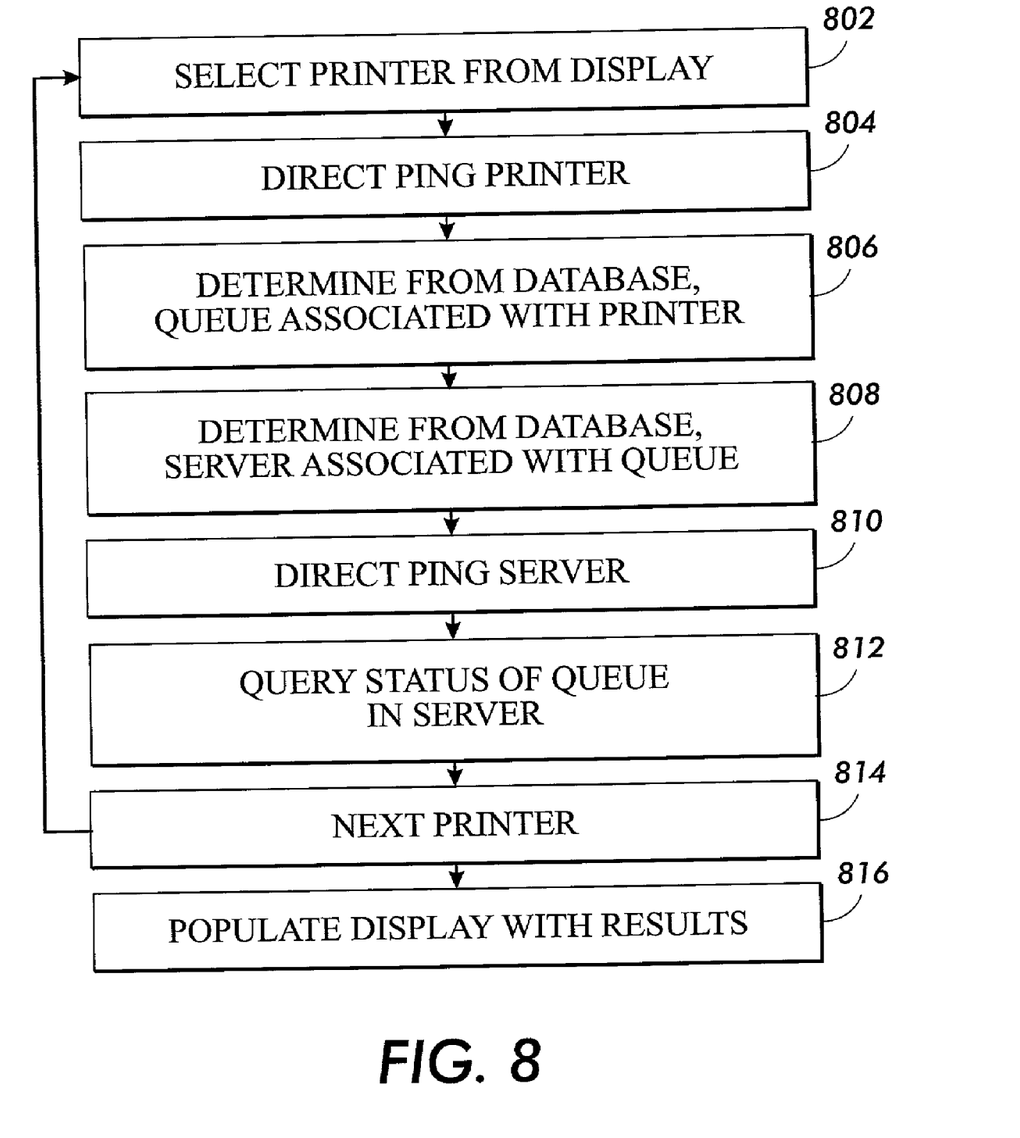
FIG. 8 is a flowchart showing a method of troubleshooting a population of printers and servers.

FIG. 8 is a flowchart showing a basic troubleshooting method according to one embodiment of the present invention. First, a printer on the network is selected, either because it has exhibited questionable behavior or for whatever reason (step 802). The printer is then "pinged" directly to its own IP address, regardless of the presence of any servers on the network (step 804). Also, from a database resident on the network, it can be determined which queues (step 806) are associated with that printer and which server (or servers) (step 808) are associated with the queues. The relevant servers supporting the printer are then pinged (step 810). Also, the status of any queues on the server can be remotely queried (step 812). As needed, another printer can be selected (step 814). Then, the results of the pinging of the printer and the associated server are compiled and displayed (step 816).

Figure 9:
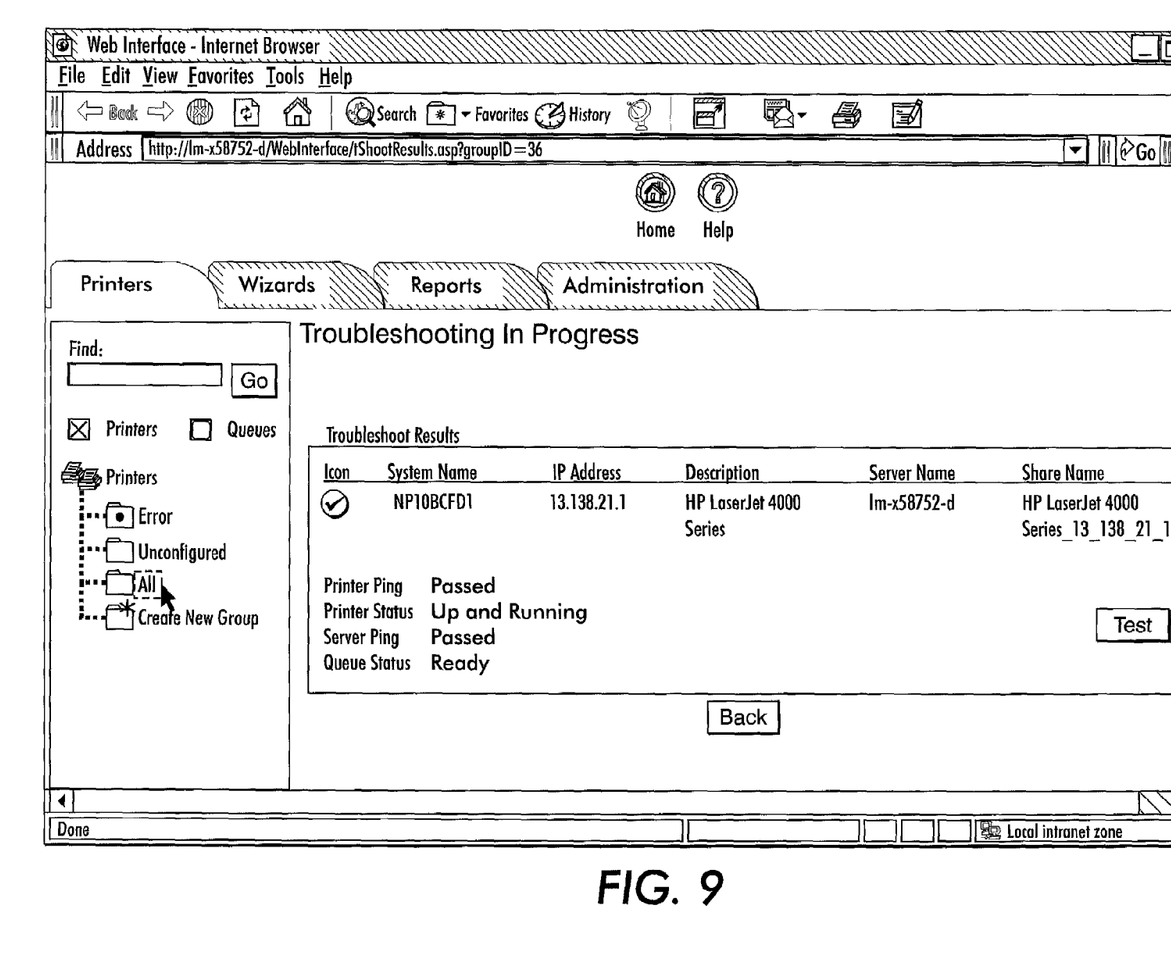
FIG. 9 is an example display which may result from the method shown in FIG. 8.

FIG. 9 is an example of a screen showing a response to such a troubleshooting method. As can be seen, the results of the pinging of each printer and its associated server, which populates a database through known means, is displayed in a list. By checking the status of the server and the printer simultaneously, a user can isolate a problem on the network.

The invention claimed is:

1. A method of operating a plurality of printers and a plurality of servers on a network, each printer and server having a network address, each server holding a print queue, comprising:
    surveying an operational status of each printer, by directly addressing the printer's network address;
    for each surveyed printer, identifying a plurality of queues on the network associated with the printer;
    surveying an operational status of each of a plurality of servers, by directly addressing the server's network address, wherein surveying an operational status of each server includes determining a server on the network associated with each identified queue;
    substantially simultaneously displaying a result of the surveying step of the printers and a result of the surveying step of the servers;
    directly querying one selected printer;
    determining queues associated with the selected printer, and then identifying servers associated with each queue associated with the selected printer; and
    querying the identified servers, thereby isolating a malfunction among the surveyed printers and servers.

2. The method of claim 1, wherein surveying the operational status of each printer includes pinging the printer's network address.

* * * * *